(12) United States Patent
Collins

(10) Patent No.: US 10,829,370 B2
(45) Date of Patent: Nov. 10, 2020

(54) COMPRESSOR HAVING WASTE HEAT RECOVERY WITH GAS RECYCLER

(71) Applicant: Ingersoll-Rand Company, Davidson, NC (US)

(72) Inventor: James C. Collins, Mooresville, NC (US)

(73) Assignee: Ingersoll-Rand Industrial U.S., Inc., Davidson, NC (US)

(*) Notice: Subject to any disclaimer, the term of this patent is extended or adjusted under 35 U.S.C. 154(b) by 149 days.

(21) Appl. No.: 15/006,485

(22) Filed: Jan. 26, 2016

(65) Prior Publication Data
US 2017/0211891 A1 Jul. 27, 2017

(51) Int. Cl.
| | |
|---|---|
| C01B 3/00 | (2006.01) |
| F17C 11/00 | (2006.01) |
| F01C 13/04 | (2006.01) |
| F01C 21/00 | (2006.01) |
| F28D 21/00 | (2006.01) |
| F01K 27/00 | (2006.01) |
| F01D 1/00 | (2006.01) |
| F01C 1/02 | (2006.01) |
| F01C 1/34 | (2006.01) |
| F01C 1/16 | (2006.01) |

(52) U.S. Cl.
CPC ............ *C01B 3/0026* (2013.01); *F01C 13/04* (2013.01); *F01C 21/008* (2013.01); *F01K 27/00* (2013.01); *F17C 11/005* (2013.01); *F28D 21/0001* (2013.01); *F01C 1/0207* (2013.01); *F01C 1/16* (2013.01); *F01C 1/34* (2013.01); *F01D 1/00* (2013.01); *Y02P 20/129* (2015.11)

(58) Field of Classification Search
CPC ............ F28D 15/0266; F28D 21/0001; C01B 3/0026; F01C 13/04; F01C 21/008; F01C 1/0207; F01C 1/16; F01C 1/34; F01K 27/00; F17C 11/005; Y02P 20/129; F01D 1/00
See application file for complete search history.

(56) References Cited

U.S. PATENT DOCUMENTS

| | | | |
|---|---|---|---|
| 3,087,898 A * | 4/1963 | Kelly, Jr. | C07C 5/3332 208/146 |
| 3,943,719 A | 3/1976 | Terry et al. | |
| 4,040,410 A | 8/1977 | Libowitz | |
| 4,085,590 A * | 4/1978 | Powell | F01K 25/00 34/416 |

(Continued)

OTHER PUBLICATIONS

Kirts; US H001189 H.*

*Primary Examiner* — Gordon A Jones
(74) *Attorney, Agent, or Firm* — Taft Stettinius & Hollister LLP

(57) ABSTRACT

A compressor and waste heat recovery system is disclosed in which mechanical work from a prime mover along with work generated from the waste heat recovery system are used to operate the compressor. A gas producing system is heated by waste heat from operation of the compressor to produce a stream of gas used to drive a turbine. The turbine is in work communication with the compressor. In one embodiment the gas producing system is a metal hydride. An overrunning clutch can be used with the turbine. In one form multiple gas producing systems are used, one of which to emit gas while the other is used to receive and capture the emitted gas.

12 Claims, 6 Drawing Sheets

(56) References Cited

U.S. PATENT DOCUMENTS

| | | | | |
|---|---|---|---|---|
| 4,161,211 A * | 7/1979 | Duffy | ............... | B60H 1/22 126/263.01 |
| 4,302,217 A | 11/1981 | Teitel | | |
| 4,311,010 A * | 1/1982 | Wurmfeld | ............... | F01K 23/02 60/641.8 |
| 4,393,924 A | 7/1983 | Asami et al. | | |
| 4,884,953 A | 12/1989 | Golben | | |
| 4,900,231 A * | 2/1990 | Kennedy | ............... | B64D 41/00 417/16 |
| 5,163,294 A * | 11/1992 | Shirai | ............... | F02B 37/007 60/602 |
| 6,128,904 A | 10/2000 | Rosso, Jr. et al. | | |
| 6,481,205 B2 * | 11/2002 | Fledersbacher | ......... | F01D 15/10 60/605.1 |
| 6,591,616 B2 | 7/2003 | Ovshinsky et al. | | |
| 6,672,078 B2 | 1/2004 | Ovshinsky et al. | | |
| 6,986,645 B2 * | 1/2006 | Iwanami | ............... | B60H 1/3208 417/16 |
| 7,454,910 B2 * | 11/2008 | Hamada | ............... | F01K 23/065 60/618 |
| 8,015,808 B2 * | 9/2011 | Keefer | ............... | F02B 43/10 60/517 |
| 10,161,271 B2 * | 12/2018 | Collins | ............... | F01K 23/12 |
| 2002/0112479 A1 * | 8/2002 | Keefer | ............... | F02B 43/10 60/651 |
| 2003/0221438 A1 * | 12/2003 | Rane | ............... | B01D 53/263 62/271 |
| 2004/0216460 A1 * | 11/2004 | Ruggieri | ............... | F01K 17/02 60/670 |
| 2005/0022963 A1 * | 2/2005 | Garrabrant | ............... | F25B 15/04 165/58 |
| 2005/0056001 A1 * | 3/2005 | Frutschi | ............... | F02C 1/105 60/39.182 |
| 2005/0200205 A1 * | 9/2005 | Winn | ............... | H02J 9/062 307/64 |
| 2005/0287407 A1 * | 12/2005 | Bushko | ............ | H01M 8/04089 141/82 |
| 2010/0011663 A1 * | 1/2010 | Coyle | ............... | F25J 1/0022 48/127.3 |
| 2010/0158702 A1 * | 6/2010 | Colavincenzo | ....... | F04B 35/002 417/16 |
| 2010/0192574 A1 * | 8/2010 | Langson | ............... | F01K 15/00 60/670 |
| 2011/0056219 A1 * | 3/2011 | Avery | ............... | F25B 27/02 62/79 |
| 2011/0265837 A1 * | 11/2011 | Rasmussen | ............... | F01K 13/00 136/205 |
| 2011/0302932 A1 | 12/2011 | Hopkins | | |
| 2012/0011871 A1 * | 1/2012 | Czechowski | ........... | F25B 27/02 62/238.3 |
| 2012/0061397 A1 * | 3/2012 | Fruchart | ............... | C01B 3/0005 220/560.04 |
| 2012/0204598 A1 * | 8/2012 | Mock | ............... | F25J 1/0022 62/613 |
| 2012/0324931 A1 * | 12/2012 | Alden | ............... | F25B 27/00 62/157 |
| 2013/0152581 A1 * | 6/2013 | Lofgren | ............... | F02B 37/105 60/605.1 |
| 2014/0250911 A1 * | 9/2014 | Huntington | ........... | F25J 1/0022 60/780 |
| 2014/0374109 A1 * | 12/2014 | Denton | ............... | B01D 53/62 166/309 |
| 2015/0047351 A1 * | 2/2015 | Ishikawa | ............... | F02G 5/04 60/615 |
| 2015/0096300 A1 * | 4/2015 | Gurin | ............... | F01K 23/10 60/645 |
| 2015/0166915 A1 * | 6/2015 | Mak | ............... | C10L 3/104 95/94 |
| 2015/0376801 A1 * | 12/2015 | Bairamijamal | ...... | B01D 53/002 204/257 |

\* cited by examiner

COMPRESSOR HAVING WASTE HEAT
RECOVERY WITH GAS RECYCLER

TECHNICAL FIELD

The present invention generally relates to fluid compressors having waste heat recovery, and more particularly, but not exclusively, to waste heat recovery using a gas recycler.

BACKGROUND

Providing fluid compressors capable of recovering waste heat remains an area of interest. Some existing systems have various shortcomings relative to certain applications. Accordingly, there remains a need for further contributions in this area of technology.

SUMMARY

One embodiment of the present invention is a unique compressor waste heat recovery system. Other embodiments include apparatuses, systems, devices, hardware, methods, and combinations for recovering waste heat from a compressor. Further embodiments, forms, features, aspects, benefits, and advantages of the present application shall become apparent from the description and figures provided herewith.

Figure 1:
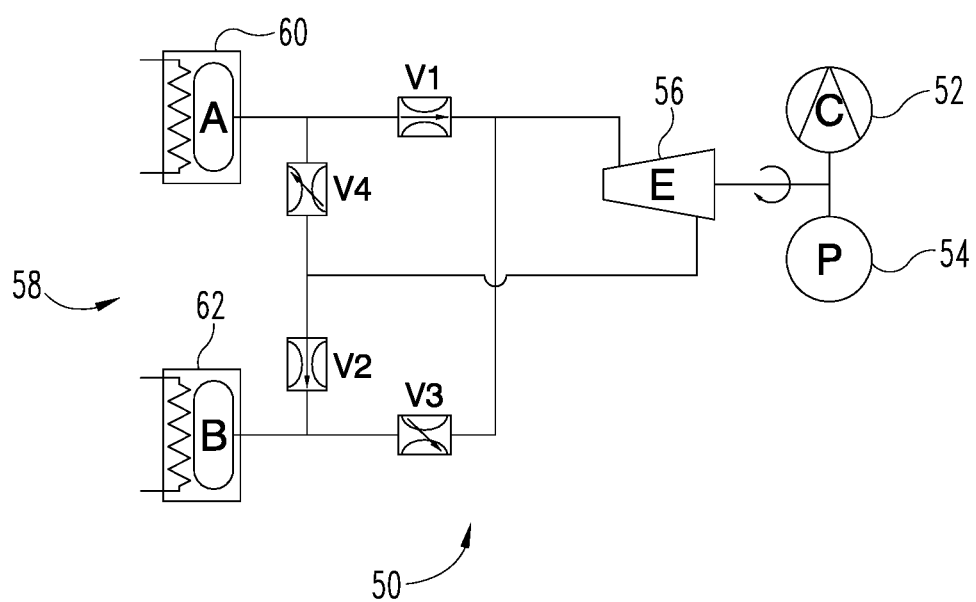
FIG. 1 depicts an embodiment of a compressor and waste heat recovery system.

DETAILED DESCRIPTION OF THE
ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, one embodiment of a compressor and waste heat recovery system 50 is disclosed which includes a compressor 52 capable of being driven by a prime mover 54 such as for example an electric motor as well as an expander 56 (described further below) which operates on passage of a fluid produced as a result of a waste heat recovery process. The compressor 52 can be an air compressor, refrigerant compressor, air blower, or non-air gas compression system where waste heat exists. In one embodiment the compressor 52 is driven simultaneously through a mechanical coupling that combines power output from the prime mover 54 as well as power output from expander 56 created as a result of recovering waste heat.

As will be appreciated in the description herein, any type of compressor/compression system can be used in which a mechanical coupling of power output from the prime mover 54 and the expander 56. For example, the compressor can be a multi-stage compressor. Alternatively and/or additionally, the compressor can be either an oil-flooded or oil-free compressor.

The expander 56 includes a mechanical device structured to produce mechanical shaft power and which moves upon interaction with a flowing fluid stream. To accomplish the conversion from fluid flow to shaft work, the expander 56 can take on the form of a turbine including, but not limited to, a reactive turbine and an impulse turbine, as well as a rotary screw expander, a scroll expander, a sliding vane expander, or similar device, among potential others. It will be appreciated that such a turbine can include any number of bladed features which interact with the moving fluid stream.

A mechanical coupling that integrates mechanical work from both the prime mover 54 and expander 56 can be achieved in many ways so that both can contribute to operation of the compressor 52. For example, the mechanical coupling can include attachment to a double shafted motor to supplement input torque to the prime mover 54; or it can be a direct attachment to the drive or driven gear between the prime mover 54 and compressor 52; or directly to an opposing shaft (i.e. doubled shafted) of the compressor 52; or to drive an alternate component within the compressor 52 such as a cooling fan, oil pump, or other rotating component independent of the prime mover 54. A mechanical gear train can alternatively and/or additionally be used to reduce and/or increase the speed of any of the prime mover 54, expander 56, and compressor 52 when used with the coupling. Furthermore, to account for situations in which the expander 56 may not provide sufficient rotation/torque to the compressor 52 relative to the prime mover 54, a clutch can be provided to permit the expander 56 to rotate freely so that the prime mover 54 is not required to also drive it along with the compressor 52. Such a clutch can take on any form, for example a sprag roller, ratcheting, Bendix drive, or any other suitable type.

To set forth just one non-limiting example of the possible combinations above, the expander 56 can be attached to a gear train to reduce speed and increase torque, which can then be connected to a driven shaft of the compressor 52 via an overrunning clutch.

A gas producing system 58 is provided to produce the flow of fluid routed through the expander 56 which in turn is used to create mechanical work to assist in driving the compressor 52. The gas producing system 58 includes a first gas system 60 and a second gas system 62. The gas systems 60 and 62 are capable of acting as a gas source and/or a gas sink and can take on a variety of forms capable of acting as such. In one form the gas systems 60 and 62 are reversible in that one or both can act as a gas source in one mode of operation and act as a gas sink in another mode of operation.

The gas systems 60 and 62 can be a metal hydride system structured to absorb/adsorb hydrogen below an activation energy level (such as a temperature) and desorb hydrogen when above the activation energy level. For example, depending on the composition the metal hydride captures hydrogen at room temperature and moderate pressure, and releases the hydrogen at higher temperatures. The exact temperature and/or pressure of release depends upon the particular metal hydride composition. The process of onboarding hydrogen can require relatively low temperatures of the metal hydride to capture the hydrogen, and the process of desorbing can require higher temperatures of the metal hydride to emit the hydrogen. A metal hydride can include any number of potential compositions. As used herein, the term "hydride" also includes ionic hydride compositions as well as those that commonly use "hydride" in its name such as palladium hydride. The metal hydride can take on a variety of forms such as powder and pellet. In one non-limiting form the metal hydride can be a film or coating applied to the inside surface of the heat exchanger bed.

A valve actuation network is provided between the gas systems 60 and 62 and the mechanical expander 56, and in the illustrated embodiment includes valves V1, V2, V3, and V4. The valves can be any type of device suitable for opening and closing fluid flow passageways. For example, the valves can be solenoids, electromechanical devices, electric actuators, hydraulic actuators, pneumatic actuators, etc. The fluid conduit network (which can be comprised of any suitable passageway materials/constructions) that connects the gas systems 60 and 62 with the mechanical expander 56 can be selectively reconfigured to provide fluid from the gas system 60 to the gas system 62, or vice versa.

The illustrated embodiment depicts valves V1 and V2 in the open position, while valves V3 and V4 are closed, to permit fluid flow from the gas system 60 to the gas system 62. To reverse the fluid flow direction, valves V1 and V2 can be closed while valves V3 and V4 are open. Such configurations in the illustrated embodiment permit fluid to traverse to the mechanical expander 56 via the same fluid intake conduit portion and exit the mechanical expander 56 from the same fluid outlet conduit portion.

One or more of the valves used in the embodiment depicted in FIG. 1, as well as valves depicted any other embodiment described herein, can be actuated via a controller structured to regulate system performance/operability/stability. The controller can be coupled with any suitable sensor to detect/measure/estimate any suitable information of the system 50. The controller can be comprised of digital circuitry, analog circuitry, or a hybrid combination of both of these types. Also, the controller can be programmable, an integrated state machine, or a hybrid combination thereof. The controller can include one or more Arithmetic Logic Units (ALUs), Central Processing Units (CPUs), memories, limiters, conditioners, filters, format converters, or the like which are not shown to preserve clarity. In one form, the controller is of a programmable variety that executes algorithms and processes data in accordance with operating logic that is defined by programming instructions (such as software or firmware). Alternatively or additionally, operating logic for the controller can be at least partially defined by hardwired logic or other hardware.

Figure 2:
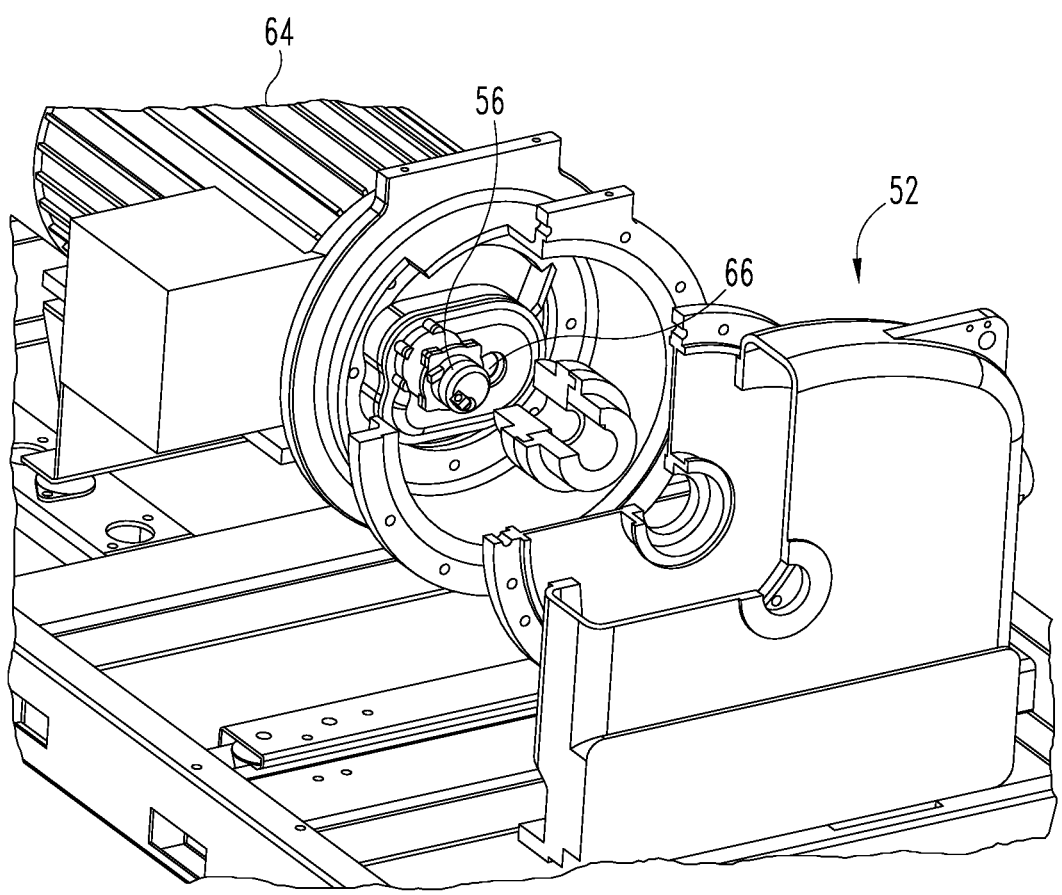
FIG. 2 depicts an embodiment of an expander.
Figure 3:
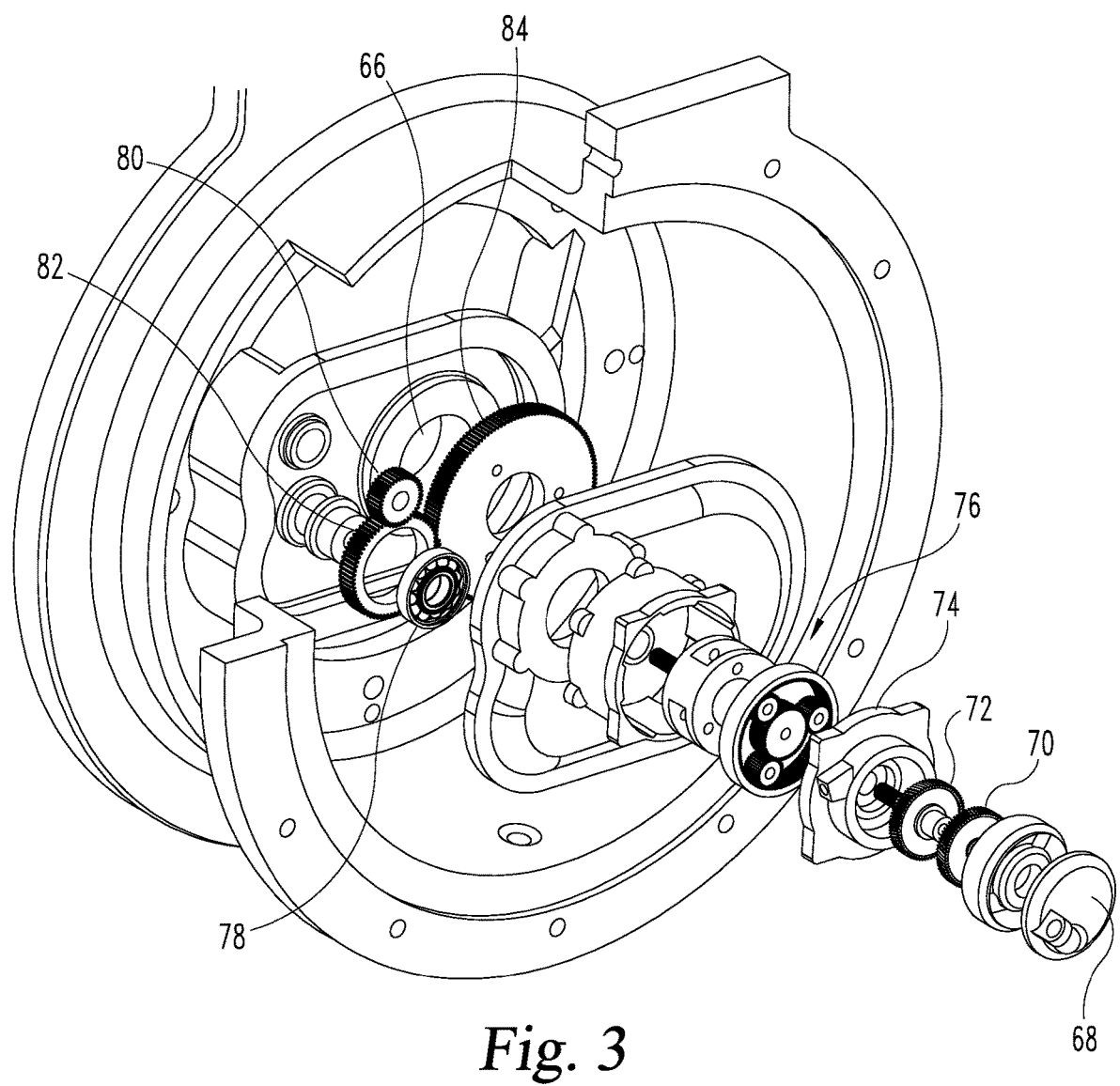
FIG. 3 depicts an embodiment of an expander.

Turning now to FIGS. 2 and 3, one embodiment is depicted of the expander 56 used to convert pressurized gas received from the gas producing system 58 to mechanical work provided to the compressor 52. The embodiment depicted in FIGS. 2 and 3 includes an electric motor 64 structured to provide motive power to the compressor 52 (only the housing of which is shown in FIG. 2 for simplicity) via a shaft that projects through passage 66 (the shaft is also not shown for simplicity). The expander 56 is shown in exploded view in FIG. 3 which depicts a flow inlet cover 68, stator nozzles 70, turbine wheel 72, turbine wheel housing 74, and speed reducing transmission 76. The speed reducing transmission is coupled through an overrun clutch 78 to a pinion 80. The pinion 80 contacts a drive gear 82 which in turn contacts a motor shaft driven gear 84 to provide work to a shaft coupled with the compressor 52.

Figure 4:
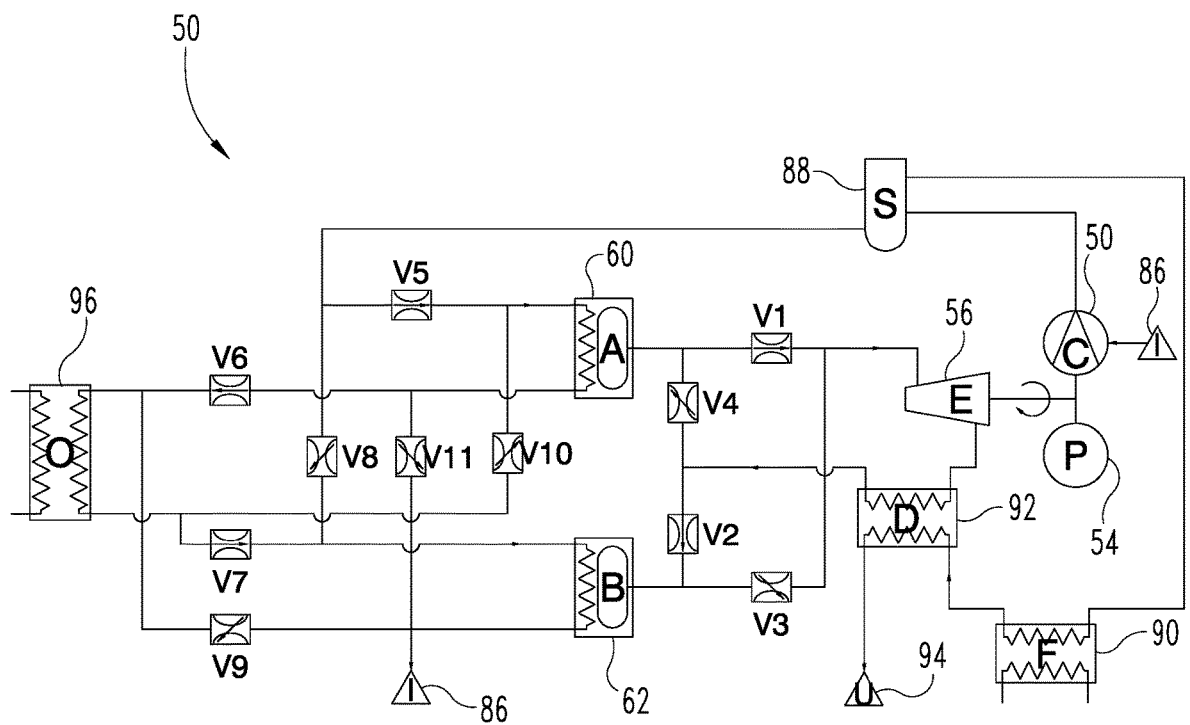
FIG. 4 depicts an embodiment of a compressor and waste heat recovery system having an oil flooded compressor.
Figure 5:
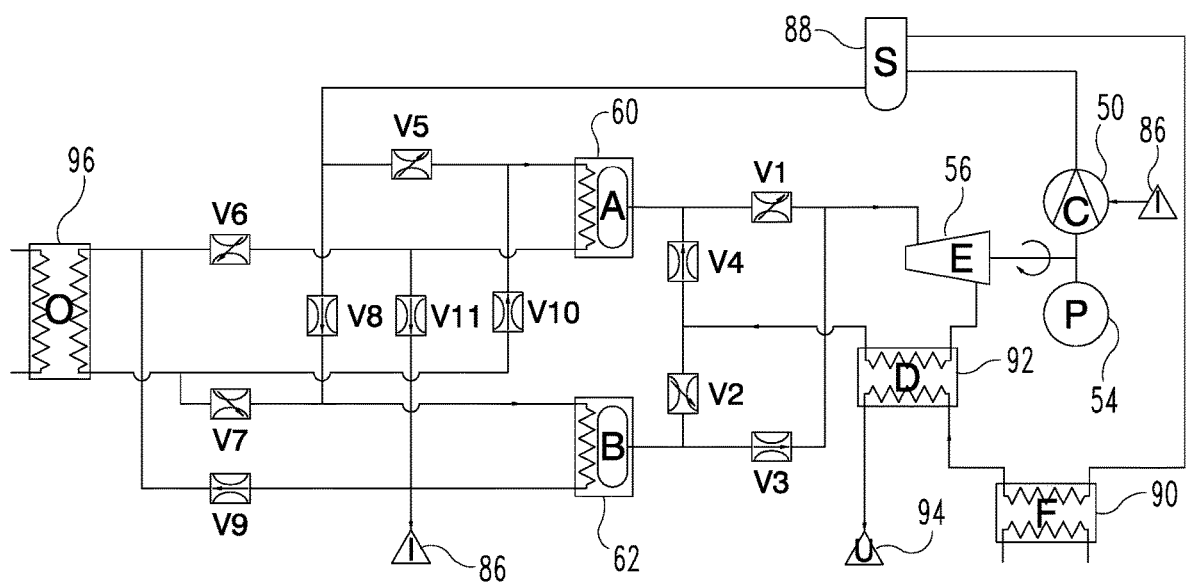
FIG. 5 depicts an embodiment of a compressor and waste heat recovery system having an oil flooded compressor.

FIGS. 4 and 5 depict an embodiment of the compressor and waste heat recovery system 50 in which the compressor 52 is an oil flooded screw compressor. Injection oil 86 is provided to the compressor 50 and together both produce a mixed stream of pressurized air and oil to a separator 88. An oil flow from the separator 88 is used as the heat transfer fluid with the gas producing system 58, and pressurized air from the separator 88 is routed first to a compressed air after cooler 90, then to a compressed air dryer 92, before being delivered to a user 94 of compressor air.

Valves V1-V10 are depicted as either open or closed to illustrated the path through which the oil flow from the separator 88 traverses. In FIG. 4 the oil flow is depicted as flowing to the gas system 60 before being routed to an oil cooler 96 and then to the gas system 62 before returning as injection oil 86. Hydrogen flow in the gas producing system 58 flows from the gas system 60, through the expander 56, and then to the compressed air dryer before being received by the gas system 62. It will be appreciated given the description herein that oil flow to gas system 60 heats the gas producing element to produce gas flow, and that the oil that flows to gas system 62 has been cooled so that the gas system 62 is likewise cooled to capture gas emitted from the gas system 60.

FIG. 5 depicts the reverse process in which oil from the separator 88 is used to heat gas system 62 so that hydrogen is released and thereafter received by gas system 64, which itself is cooled by the oil after passing through devices to reduce its temperature including the gas system 60 as well as other heat exchangers.

Figure 6:
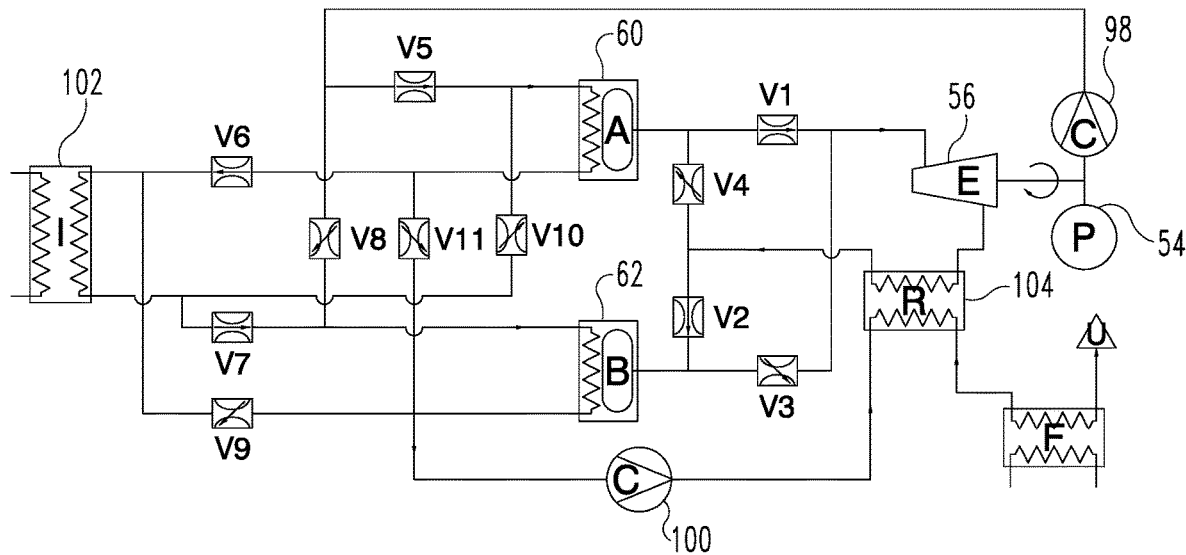
FIG. 6 depicts an embodiment of a compressor and waste heat recovery system having a two stage compressor.

Turning now to FIG. 6, an embodiment is depicted of the compressor and waste heat recovery system 50 in which the compressor 52 includes a first stage compressor 98 and a second stage compressor 100. Air that is compressed by the stages 98 and 100 is used to provide heating to the gas producing system 58. Compressed air from the first stage 98 is first routed to gas system 60 (to heat and release gas therefrom) before being routed to a compressed air inter cooler 102, then to gas system 62 (to cool and thereby capture gas thereto) before being delivered to the second stage 100. From the second stage 100 the compressed air is provided to a hydrogen reheater/compressed air precooler 104 before being routed to a compressed air after cooler 106 and thence to a user 94. Gas flows between the gas systems 60 and 62 as will be appreciated given the general description above.

As will also be appreciated, when the reverse process is desired, the valve network can be reconfigured similar to the changes seen in FIGS. 4 and 5 to permit a change in the heating/cooling combination of gas systems 60 and 62 as well as a change in the flow path between gas systems 60 and 62.

One aspect of the present application provides an apparatus comprising a compressor system having a motor structured to provide work to a rotary compressor element that is structured to compress a fluid and thereby increase the pressure of the fluid at the same time that it produces heat, the compressor system including a heat rejecting component in thermal communication with the rotary compressor element; and a waste heat recovery system having a flowpath for the conveyance of a gas and a mechanical expander disposed in the flowpath to extract work from the conveyance of the gas and communicate the work to the rotary compressor element, the waste heat recovery system also having a chemical based gas storage device in thermal communication with the heat rejecting component of the compressor system, the chemical based gas storage device structured to desorb the gas at an activation energy level and capture the gas below the activation energy level through a sorption process, the gas being a different substance than a material of the chemical based gas storage device.

A feature of the present application provides wherein the chemical based gas storage device is a metal hydride.

Another feature of the present application provides wherein the metal hydride is in one of a powder form, pellet form, film form, or a coating form.

Yet another feature of the present application further includes a clutch disposed between the mechanical expander and the rotary compressor such that if insufficient rotative work is contributed by the mechanical expander the clutch is structured to permit free rotation of the rotary compressor element.

Still another feature of the present application provides wherein the rotary compressor element is a multiple stage compressor, and which further includes an intercooler heat exchanger disposed between a first stage of the multiple stage compressor and a second stage of the multiple stage compressor, the intercooler heat exchanger structured to cool a compressed air received from the first stage of the multiple stage compressor.

Yet still another feature of the present application provides wherein the rotary compressor element is an oil filled screw compressor, and which further includes an oil cooler structured to cool oil from the oil filled screw compressor.

Still yet another feature of the present application provides wherein the activation energy level is a temperature and which further includes an air/oil separator structured to receive an air/oil mixture from the rotary compressor element and convey separated air to a heat exchanger in thermal communication with the chemical based gas storage device.

A further feature of the present application includes another chemical based gas storage device disposed in flow path communication with the chemical based gas storage device such that the another chemical based gas storage device can capture the gas that is desorbed from the another chemical based gas storage device, and wherein the waste heat recovery system communicates mechanical work to the rotary compressor element.

A still further feature of the present application provides wherein the mechanical expander is a turbine.

Another aspect of the present application provides an apparatus comprising a compression system having a compressor driven by a prime mover and structured to increase a pressure and temperature of a working fluid, the compression system in thermal communication with a heat exchanger and structured to convey heat generated as a result of operation of the prime mover, and a supplemental work producing system structured to deliver work to the compressor which is supplemental to work provided by prime mover, the supplemental work producing system having a mechanical expander and a hydride gas recycler having a material composition that chemically initiates gas on-boarding below an activation energy level and gas emission above the activation level, wherein heat produced as a result of operation of the prime mover as it increases temperature of the working fluid is transferred through the heat exchanger to raise the temperature of the hydride gas recycler and thereby emit gas, the emitted gas routed through the mechanical expander to produce the supplemental work.

A feature of the present application provides wherein the prime mover is an electric motor, wherein the gas is hydrogen, and where the heat produced as a result of operation of the prime mover is in the form of an elevated temperature of the working fluid.

Another feature of the present application provides wherein the hydride gas recycler includes a first and second gas recycler in gaseous communication with one another via a flow path such that when the first gas recycler contributes gas via gas emission, the second gas recycler reclaims gas via on-boarding of gas, and where the mechanical expander is located in the flow path between the first gas recycler and the second gas recycler.

Yet another feature of the present application further includes a gear train in mechanical communication with the mechanical expander, wherein the gear train is structured to provide rotative output in an output direction when the gas flows through the mechanical expander from the first gas recycler to the second gas recycler, and wherein the gear train is structured to provide rotation output in the output direction when the gas flows through the mechanical expander from the second gas recycler to the first gas recycler.

Still another feature of the present application provides wherein the flow path includes an actuatable valve network that can be activated to reconfigure the flow path such that flow of gas through the mechanical expander occurs in the same direction irrespective of whether the first gas recycler or the second gas recycler is a gas emitter.

Yet still another feature of the present application further includes a clutch structured to discourage back driven behavior from the prime mover to the mechanical expander.

Still yet another feature of the present application provides wherein the compressor is a multi-stage compressor, and which further includes an intercooler between the stages.

A further feature of the present application provides wherein the compressor is an oil flooded compressor, and which further includes an air/oil separator, a oil/gas recycler heat exchanger that receives oil from the air/oil separator and exchanges heat with the first gas recycler, and an oil cooler positioned downstream of the oil/gas recycler.

Yet another aspect of the present application provides an apparatus comprising a compressor system having a motor structured to drive a compressor element, the compressor element configured to provide a compressed fluid when work from the motor is applied to it, and means for converting waste heat from the compressor system to mechanical work, the mechanical work added to the work provided from the motor to the compressor element.

Still yet another aspect of the present application provides a method comprising providing motor driven mechanical work to a compressor such that the compressor can produce a stream of compressed fluid, generating heat as a result of providing the mechanical power, heating a gas producing solid above an initiation temperature to produce a gas from the solid, routing the produced gas from the gas producing solid element to a mechanical expander to extract work from the mechanical expander, and mechanically summing the motor driven mechanical work with the work from the mechanical expander to complementarily drive the compressor.

A feature of the present application provides wherein the heating a gas producing solid includes transferring heat to a metal hydride material such that gas is produced in the form of hydrogen.

Another feature of the present application provides wherein the routing includes conveying the hydrogen to another gas producing solid element, which further includes operating a clutch during operation rotation of the mechanical expander, wherein the compressor is an oil flooded compressor, which further includes separating compressed air from oil and exchanging heat between the oil and the gas producing solid via a heat exchanger such that gas is produced as a result of the exchange of heat.

Yet another feature of the present application provides wherein the providing includes delivering work to a first compressor stage and a second compressor stage of the compressor element.

Yet still another feature of the present application further includes routing the stream of compressed fluid through a first heat exchanger in thermal communication with the gas producing solid, thence through an intercooler to provide cooling of the stream of compressed fluid, and thence through a second heat exchanger in thermal communication with another gas producing solid.

Still yet another feature of the present application further includes on-boarding the produced gas into the another gas producing solid.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
   a compressor system having a motor structured to provide mechanical work to a rotary compressor element that is structured to compress a fluid and thereby increase the pressure of the fluid at the same time that the rotary compressor element produces heat, the compressor system including a heat rejecting component in thermal communication with the rotary compressor element; and
   a waste heat recovery system having a flowpath for conveyance of a gas and a mechanical expander that includes a movable mechanical member to produce mechanical shaft power as a result of a movement of the movable mechanical member during operation of the compressor system, the mechanical expander disposed in the flowpath and structured such that the movement of the movable mechanical member is used to extract a work from the conveyance of the gas and communicate the work to the rotary compressor element, the movable mechanical member not in gaseous communication with the rotary compressor element, the waste heat recovery system also having a chemical based gas storage device in thermal communication with the heat rejecting component of the compressor system, the chemical based gas storage device structured to desorb the gas at an activation energy level and capture the gas below the activation energy level through a sorption process, the gas being a different substance than a material of the chemical based gas storage device, wherein the fluid compressed by the rotary compressor element is separate from the gas that flows in the waste heat recovery system such that no part of the fluid compressed by the rotary compressor element flows through the movable mechanical member of the mechanical expander; and
   which further includes another chemical based gas storage device disposed in flow path communication with the chemical based gas storage device such that the another chemical based gas storage device is structured to capture the gas, wherein the gas is desorbed from the another chemical based gas storage device, and wherein the waste heat recovery system communicates mechanical work to the rotary compressor element.

2. The apparatus of claim 1, wherein the chemical based gas storage device is a metal hydride.

3. The apparatus of claim 2, wherein the metal hydride is in one of a powder form, pellet form, film form, or a coating form.

4. The apparatus of claim 2, which further includes a clutch disposed between the mechanical expander and the rotary compressor element such that if insufficient rotative work is contributed by the mechanical expander the clutch is structured to permit free rotation of the rotary compressor element.

5. The apparatus of claim 4, wherein the rotary compressor element is a multiple stage compressor, and which further includes an intercooler heat exchanger disposed between a first stage of the multiple stage compressor and a second stage of the multiple stage compressor, the intercooler heat exchanger structured to cool a compressed air received from the first stage of the multiple stage compressor.

6. The apparatus of claim 1, wherein the mechanical expander is a turbine.

7. An apparatus comprising:
   a compression system having a compressor driven by a prime mover and structured to increase a pressure and temperature of a working fluid, the compression system in thermal communication with a heat exchanger and structured to convey heat generated as a result of operation of the prime mover; and
   a supplemental work producing system structured to deliver work to the compressor which is supplemental to work provided by the prime mover, the supplemental work producing system having a mechanical expander and a hydride gas recycler having a material composition that chemically initiates gas on-boarding below an activation energy level and gas emission above the activation energy level;
   wherein heat produced as a result of operation of the prime mover increases temperature of the working fluid is transferred through the heat exchanger to raise a temperature of the hydride gas recycler and thereby emit gas, the emitted gas routed through the mechanical expander to produce the work delivered by the supplemental work producing system, the mechanical expander including a movable mechanical member structured to generate mechanical shaft power when the emitted gas is routed through the mechanical expander during operation of the compression system, the movable mechanical member fluidically isolated from the compressor such that no portion of the emitted gas flows through the compressor, and no portion of the working fluid flows through the mechanical expander; and wherein the hydride gas recycler includes a first and second gas recycler in gaseous communication with one another via a flow path such that when the first gas recycler contributes the gas via gas emission, the second gas recycler reclaims the gas contributed by the first gas recycler via on-boarding of gas, and where the mechanical expander is located in the flow path between the first gas recycler and the second gas recycler.

8. The apparatus of claim 7, wherein the prime mover is an electric motor, wherein the gas is hydrogen, and where the heat produced as a result of operation of the prime mover is used during operation to produce an elevated temperature of the working fluid.

9. The apparatus of claim 7, which further includes a gear train in mechanical communication with the mechanical expander, wherein the gear train is structured to provide rotative output in an output direction when the gas flows through the mechanical expander from the first gas recycler to the second gas recycler, and wherein the gear train is structured to provide rotation output in the output direction when the gas flows through the mechanical expander from the second gas recycler to the first gas recycler.

10. The apparatus of claim 9, wherein the flow path includes an actuatable valve network that can be activated to reconfigure the flow path such that flow of the gas through the mechanical expander occurs in a same direction irrespective of whether the first gas recycler or the second gas recycler is a gas emitter.

11. The apparatus of claim 7, which further includes a clutch structured to discourage back driven behavior from the prime mover to the mechanical expander.

12. The apparatus of claim 11, wherein the compressor is a multi-stage compressor having a first stage and a second stage, and which further includes an intercooler between the first stage and the second stage of the multi-stage compressor.

* * * * *